Aug. 5, 1958 S. BEIDLER 2,846,521

DUAL CHANNEL HEADSET

Filed July 18, 1957

INVENTOR
SHEPPARD BEIDLER
BY Eugene S. Lovette
ATTORNEY

United States Patent Office 2,846,521

Patented Aug. 5, 1958

2,846,521

DUAL CHANNEL HEADSET

Sheppard Beidler, New York, N. Y.

Application July 18, 1957, Serial No. 672,597

2 Claims. (Cl. 179—156)

This invention relates to improved telephonic apparatus including electro-acoustical pickups and more particularly, apparatus having a single acoustical amplifying chamber in which a plurality of such pickups are mounted. The pickups are coupled to respective ones of individual receivers such that only one ear of the user of such telephone apparatus need be employed for receiving intelligence from the receivers.

In certain applications of telephonic headsets and in particular, for television camera dolly operators, the operator is normally furnished a conventional pickup headgear which includes a connected mouthpiece. Because of the numerous directions that must be given to the camera dolly operator from widely separated sources, it has been found necessary to have at least two separate receivers in operation. Each receiver is coupled to respective earpieces of the headset. Heretofore, each pickup of the conventional headset has been supported in a well-known manner such that each earpiece is held against a respective ear of the operator, whereas the microphone unit is suspended adjacent the operator's mouth. This has raised a serious problem in the operation of the camera dolly, because it is difficult to transmit unplanned, or otherwise extemporaneous emergency directions verbally to the operator, whose ears are covered by the earpieces to correct for or warn against unforeseen events occurring on the stage during operation of a dolly. Often, this limitation has been the cause of serious accidents to persons, mistakes in operation of the camera, particularly during a production of a show and destruction of property, for example, when a dolly is propelled against other property not seen by the operator. This problem has become particularly hazardous during actual performance of a show when loud verbal directions are not feasible. Attempts, heretofore, to correct the problem have involved stationing a man near and in the line of sight of the operator in order to give visual signals, but such a practice has not proved satisfactory.

It is the principal object of the instant invention to mount a plurality of miniature capsule electro-acoustical pickups in a single acoustic amplifying chamber of telephonic gear to allow the other ear to remain uncovered and free to receive vebral directions. The method of mounting is such that it does not impair the effective acoustic amplification provided by the single chamber in which the capsules are mounted and avoids cross-talk or other interference between the two circuits. Heretofore, it has been thought that the assemblage of a plurality of electro-acoustical pickups in a single acoustical chamber of headphone gear would not be feasible because of impairment of the amplification characteristics of the chamber. The practice of the instant invention overcomes this limitation of the prior art.

It is a further object of the instant invention to mount a pair of pickup capsules in an acoustical chamber in symmetrical fashion in order to achieve optimum amplification for each circuit served by the respective ones of the pickups.

It is a further object of the instant invention to provide novel means in order to suspend a pair of electro-acoustical pickups in a single acoustical chamber.

It is a further object of the instant invention to provide an economical and simple to use structure permitting the use of a plurality of electro-acoustical pickups in a single echo chamber of telephonic apparatus.

Further objects and advantages will become apparent from the following description of the invention taken in conjunction with the figures, in which.

Figures 1, 2, 3, 4:
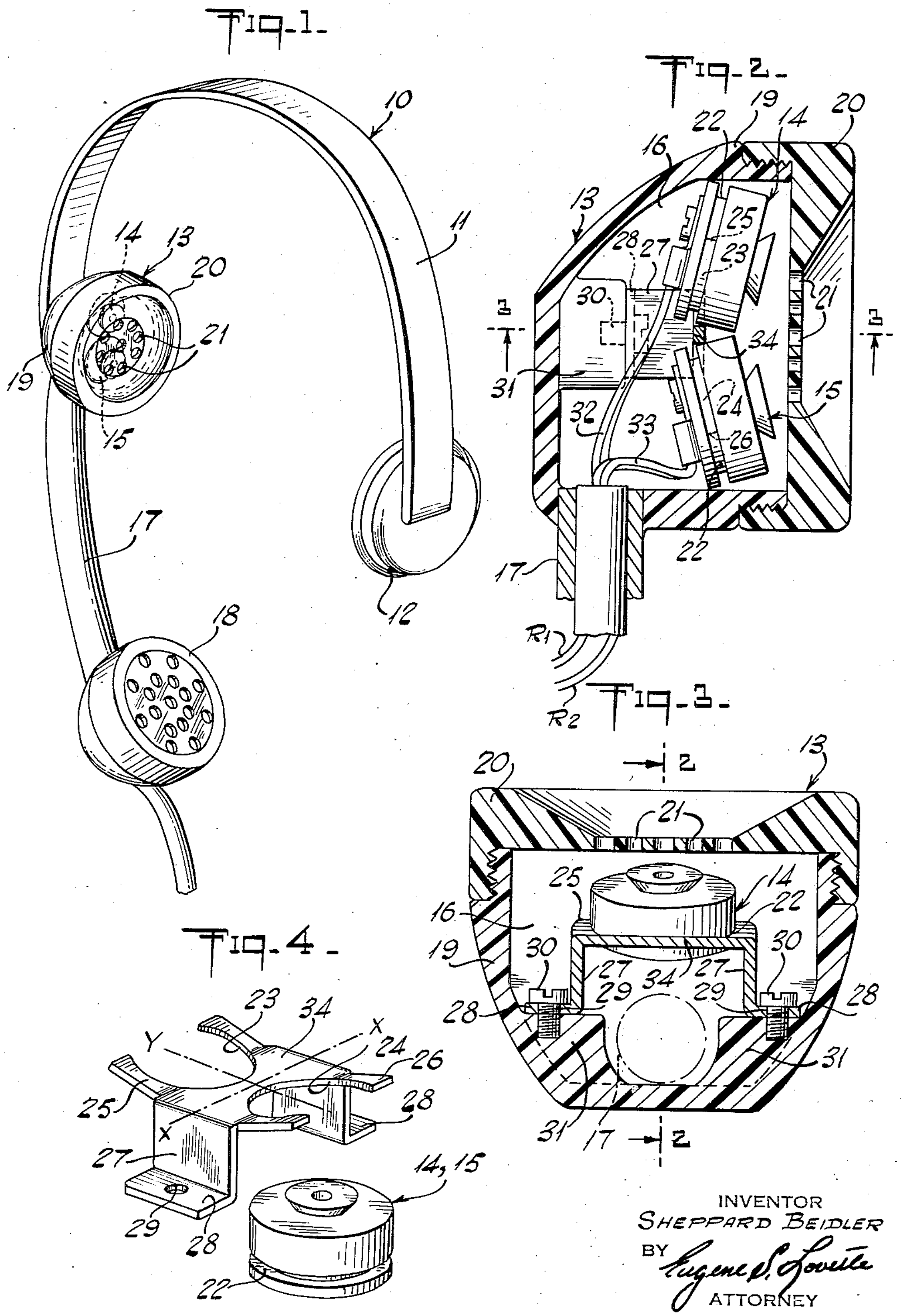
Fig. 1 is a perspective view of telephonic headgear incorporating the principles of the instant invention.
Fig. 2 is a sectional view showing the interior of a single-chambered earpiece and the disposition of a pair of miniature electro-acoustical pickup capsules supported therein, in accordance with the principles of the instant invention.
Fig. 3 is a sectional view taken along line 3—3 of Fig. 2.
Fig. 4 is a perspective view of the mounting bracket for supporting the individual capsules and also includes a perspective view of a capsule.

Reference is now made to the drawing, the figures of which illustrate a telephonic headset 10 having a conventional U-shaped strap 11 adapted to fit over the the operator's head. A pad 12 is fastened at one end of strap 11 and is provided with a soft inner surface adapted to rest against one side of the wearer's head, but not against his ear. An acoustical amplifying chamber earpiece 13 is suspended from strap 11 substantially opposite pad 12, but in this case earpiece 13 is adapted to rest in the well-known manner against the ear of the wearer. A pair of cylindrical-shaped, miniature electro-acoustical pickup units 14, 15 are suspended in accordance with the principles of the instant invention within the acoustical chamber 16. A relatively firm support 17 extends downwardly from earpiece 13. A conventional microphone 18 is fastened to support 17 such that when in use it is suspended adjacent to the operator's mouth. Earpiece chamber 16 is formed by the interior of a hollowed outer shell 19 and a removable cover 20 threadedly secured to the main portion of shell 19. Centrally disposed openings 21 in cover 20 communicate with chamber 16 and permit sound to reach the ear of the wearer from either one of the two capsules 14, 15. Capsules 14, 15 in all respects are conventional electro-acoustical pickup units except that they have annular grooves 22 along the outer peripheries thereof.

Capsule grooves 22 are adapted to register with respective ones of U-shaped fingers 23, 24 formed by recesses disposed in oppositely extending flanges 25, 26 of a mounting bracket 27 for the purpose of supporting capsules 14, 15 in a desired position in echo chamber 16. Fingers 23, 24 extend circumferentially more than 180° in order to hold capsules 14, 15 after the latter are spring-snapped into respective recesses. Bracket 27 is made preferably of light-weight, resilient material so that capsules 14, 15 may be spring-snapped thereon and removed therefrom when desired.

It will be noted that flanges 25, 26, and in particular fingers 23, 24 are symmetrically disposed on opposite sides of bracket axis X. Similarly, opposed fingers of each pair 23, 24 are disposed symmetrically on opposite sides of the Y axis of bracket 27. In addition, flanges 25, 26 are also folded upward to extend obliquely an acute angle from the horizontal plane, containing axis X, Y. The geometric characteristics of bracket 27 as noted hereinbefore, locates and maintains each capsule 14, 15 in a suitable position in chamber 16 such that optimum amplification is provided by chamber 16 for signals emitted by each capsule. The disclosed arrangement also avoids acoustical interference between the circuit of one capsule with respect to the other. For example, it will be noted that both capsules are oriented to direct signals therefrom toward apertures 21. The signal emitting portion of each capsule is held adjacent apertures 21 along the interior side of cover 20. From Fig. 2 it will be noted that each capsule is disposed substantially symmetrical with respect to the other capsule about a horizontal center line through chamber 16; whereas from Fig. 3 it it noted that the capsules are substantially centrallized with respect to a vertical axis.

Mounting bracket 27 is made of a thin blank of lightweight material formed as shown in Fig. 4. The formed bracket does not unduly fill chamber 16 so as to impair its amplifying characteristics and is so shaped that capsules are disposed in the forward portion of chamber 16 adjacent cover 20. Mounting bracket 27 is provided with a pair of L-shaped clamping flanges 28 extending integrally from opposed sides of bracket web 34. Flanges 25, 26 extend integrally from the other opposed sides of web 34. L-flanges 28 have portions with holes 29 extending in opposite directions along the X axis to receive clamping screws 30 for fastening the capsule supporting bracket 27 to an interior annular ledge 31 of chamber 16. Lead wires 32, 33 from the rear of respective capsules 14, 15 are provided with suitable conduit means in order to connect each capsule to a respective receiver R1, R2 to permit each capsule to receive signals from widely separated sources. The signals over the two circuits generally are not intelligent words but coded "peeps" when the invention is used for a television dolly operator. To help the operator to distinguish one circuit or source of information from the other, the signals may be of different tones for the respective sources.

Although the invention is illustrated herein as applied to telephone headgear, it will be understood that it is equally applicable to other types of telephonic apparatus. Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A telephonic earpiece device comprising, an earphone unit having a hollow interior serving as an acoustical amplifying chamber, means for locating said earphone unit adjacent one ear of the user, said earphone unit having sound conducting apertures communicating with said chamber along the side thereof to be located against the user's ear, a bracket symmetrical with respect to its cross axes and having a pair of holding elements, respective ones of said holding elements being disposed on opposite sides of one axis of said bracket, and an electro-acoustical pickup capsule held by each of said holding elements, clamping means for fastening said bracket to an interior wall of said chamber, the symmetry of said bracket and said fastening means being such that each acoustical pickup capsule is symmetrically disposed on an opposite side with respect to one axis of said chamber, and substantially in alignment with the other axis of said chamber in order to provide optimum amplification of sound transmitted by each of said capsules.

2. Apparatus as defined in claim 1 wherein, each pickup is a miniature capsule having annular grooves along its cylindrical periphery, said bracket being made of thin, sheet-like material, said clamping means comprising, L-shaped flanges extending integrally from opposite sides of a centrallized web of said bracket, and said holding elements comprising, spring fingers formed by U-shaped recesses disposed along another pair of oppositely extending flanges, said last-mentioned flanges extending integrally from another pair of opposed sides of said web, each pickup being snap-spring locked in a respective recess by register of the latter with the said capsule grooves, said flanges extending obliquely an acute angle from the plane of the bracket cross axes in order to locate the signal emitting portion of each capsule adjacent said apertures and for directing signals emitted therefrom toward said apertures.

No references cited.